United States Patent [19]
Voit

[11] 3,824,006
[45] July 16, 1974

[54] OPTICAL SPECTACLES INCLUDING ADHESIVE BONDING MEANS BETWEEN METAL SPECTACLE FRAMES AND OPHTHALMIC LENSES

[76] Inventor: Franz Voit, No. 6, Talstrasse, Eutingen/Baden, Germany

[22] Filed: Nov. 24, 1971

[21] Appl. No.: 201,665

Related U.S. Application Data

[63] Continuation-in-part of Ser. No. 818,245, April 22, 1969, abandoned.

[30] Foreign Application Priority Data

Apr. 23, 1968 Germany.............................. 1772266

[52] U.S. Cl..................... 351/106, 351/92, 351/178
[51] Int. Cl.......................... G02c 1/04, G02c 13/00
[58] Field of Search....................... 351/178, 106, 92

[56] References Cited
UNITED STATES PATENTS

| | | | |
|---|---|---|---|
| 2,841,051 | 7/1958 | Stegeman............................ | 351/106 |
| 3,243,249 | 3/1966 | Lissac............................. | 351/106 X |

FOREIGN PATENTS OR APPLICATIONS

| | | | |
|---|---|---|---|
| 2,006,739 | 1/1970 | France................................. | 351/178 |

*Primary Examiner*—Ronald L. Wibert
*Assistant Examiner*—Paul A. Sacher
*Attorney, Agent, or Firm*—Markva & Smith

[57] ABSTRACT

A pair of optical spectacles comprising metal frame parts and lenses of silicate glass bonded to the frame parts with a bonding agent and a method of producing same. The bonding agent is a heat curable material disposed between and in direct contact with the metal parts and lenses. The heat curable material comprises a low melting powder metal mixed with a heat curable eopxy resin adhesive having a hardener which provides a source of hydrogen. In a specific embodiment of the invention, the bonding agent is placed on the frame parts and lenses initially before the final bonding is effected between the parts. The bonding of the parts is effected by heating the combination thereof to a temperature of up to above 300° C. More specifically, the combination of the frame parts, lenses and bonding agent is heated to a temperature within a range of from about 200° C to about 300° C.

6 Claims, 6 Drawing Figures

PATENTED JUL 16 1974

3,824,006

OPTICAL SPECTACLES INCLUDING ADHESIVE BONDING MEANS BETWEEN METAL SPECTACLE FRAMES AND OPHTHALMIC LENSES

RELATED APPLICATION

This application is a continuation-in-part of copending application Ser. No. 818,245 filed Apr. 22, 1969, now abandoned, by the same inventor.

BACKGROUND OF THE INVENTION

The invention relates to optical spectacles, and more specifically to a novel type of connection between silicate glass lenses and their metal retaining parts such as the bridge, the bow hinge, the bracket, decorative features, etc. There are a number of problems associated with the known methods of connecting spectacle parts. Such prior connections make use of pure adhesive which, even at normal temperatures, possess a very low strength. This low strength is further reduced when such spectacles are heated such as in tropical regions. Because the prior art pure adhesive connections have such a low strength, the joints between the metal parts and the lenses must be extremely large. Consequently, the field of view is limited. That is, more metal is required to be placed in the parts additionally resulting in increased cost and spectacles having a relatively heavy weight.

A further problem in the production of spectacles consists in the fact that they cannot, as a rule, be bought ready for use. The spectacle lenses must first be prescribed by an ophthalmologist in accordance with the optical properties required for the eyes of the spectacle wearer. The optician must obtain the lenses from an optical factory. Frame parts have to be obtained from a metal goods manufacturer. All these parts must then be selected by the optician in accordance with the anatomical features of the spectacle wearer's face and the wearer's esthetic requirements. Only then can the spectacles be assembled.

PURPOSE OF THE INVENTION

It is the primary object of this invention to provide spectacle lenses which offer as wide a field of view as possible and are largely free from joints and connecting parts when manufactured as a part of the optical spectacles made in accordance with this invention.

It is another object of this invention to provide optical spectacles and a method of making same wherein it is possible to exercise a maximum of esthetic freedom with respect to the contours of the spectacle lenses.

It is a further object of this invention to provide optical spectacles wherein the metal parts of the spectacles may be extremely small, particularly with respect to their joint connections with the silicate glass lenses.

A still further object of this invention is to provide a connection between small metal spectacle parts and silicate glass lenses wherein there is an especially high strength per unit of area and at the same time complete temperature stability with respect to the bonding agent used to effect the desired connection.

Another object of the invention is to provide a practical way for carrying out the assembly of spectacles by placing the composite bonding agent of the present invention onto the individual parts before the final bonding step is effected to form the completed spectacle combination.

A still further object of this invention is to provide a joint having a structural configuration whereby the joint between the metal parts and the glass lenses occupies a shorter length in the direction of the lense periphery while having a greater transverse width, i.e., in depth, and thus cover a wider area.

SUMMARY OF THE INVENTION

According to a first characteristic of the invention, a pair of spectacles comprises metal frame parts and lenses composed of silicate glass bonded together through the use of a heat curable bonding agent disposed therebetween and in direct contact with the metal parts and the lenses. The bonding agent comprises a mixture of a powder metal material having a low melting point and a heat curable epoxy resin having a hardener which provides a source of hydrogen. The metal spectacle parts may consist of the bracket, the bridge or the mounting pieces for the bow joints. These spectacle parts are joined with the silicate glass lenses along the edge portions. The edge portions which are to be connected one with the other should be as small as possible. The powder metal material having a low melting point may be tin, bismuth, or any other suitable material having a low melting point whereby when the combination frame parts, lenses and bonding agent are subjected to a temperature in a range of about 200° C and about 300° C, a welded bond having a great strength is formed. In a specific embodiment of the invention, the metal parts have a V-groove and the lenses have a roof profile along the edge to be joined to the frame part in said V-groove. The bonding agent is disposed between the V-groove and the roof profile.

A further feature of the invention is directed to a combination for use in forming a pair of spectacles comprising a contiguous layer of a bonding agent disposed along an edge portion of a first part to be joined to a second part. The bonding agent is adhered to the first part by subjecting same to heat at a first temperature. The bonding agent is adapted to join the first part to the second part by subjecting the combination of the bonding agent between the first and second parts to a second application of heat at a second temperature. In a specific embodiment of this invention, both the metal parts of the spectacles and the silicate lenses are first coated with a bonding agent which is disposed thereon by heating same to about 130° C without joining the parts. The coated spectacle parts can be stored and kept in stock in this manner until they are needed to assemble the spectacles themselves. Once the optician has combined spectacle parts prepared in accordance with this invention, they can be fixed to one another and bonded with the aid of ultrasonic, infrared or resistance welding. During the application of heat in this manner, the coatings on both faces are fused with one another thereby joining the metal parts to the lenses. Resistance welding may also be used to fuse metal parts to the silicate glass lenses whether the parts have been coated with the bonding agent previously or not.

A further feature of the invention is directed to the method of producing a pair of spectacles. In a very specific embodiment of the invention, the bonding agent is introduced into the joint between the metal frame parts and the lenses by applying it to both sides of a metal foil or around a metal wire. An electric current is passed through the foil or wire after its introduction into the joint thereby forming a resistance welding.

This resistance welding method has the advantage that it can be carried out after selection of the separate spectacle parts or in the course of repairs.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
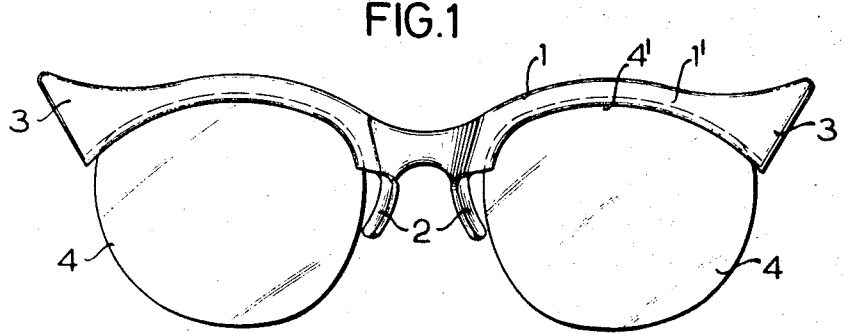
FIG. 1 is a front elevational view of a pair of spectacles made in accordance with the first embodiment of this invention.

More specifically, in the embodiment shown in FIG. 1, the spectacles have a bracket 1 curved in a wavy form and preferably made of a light metal. The bracket 1 includes bridge extensions 2 for mounting the bridge on the nose and butts 3 for articulated attachment of the bow ends (not shown). The bracket 1 is made of one piece together with the extensions 2 and butts 3. The upwardly arched portions 1 are located between the extensions 2 and butts 3. The spectacle lenses 4 are joined along their upper edges 4' to the upwardly arched portions 1' through the use of a bonding agent 5.

Figures 3, 4:
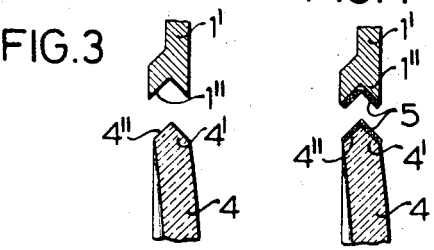
FIG. 3 is a cross-sectional view through the unassembled edge portions of spectacle parts.
FIG. 4 is a cross-sectional view similar to FIG. 3 after the application of a bonding agent.
Figure 5:
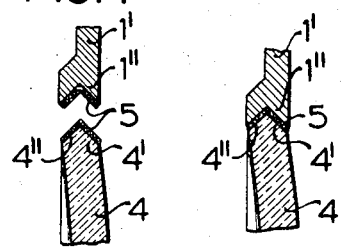
FIG. 5 is a cross-sectional view showing the parts of FIG. 4 after bonding has been effected.

The upwardly arched portions 1' have a V-shaped groove along their lower edge while the spectacle lenses 4 have a corresponding roof profile 4'' along their upper edges 4' as shown in FIGS. 3 through 5. As a result, the joining faces are enlarged in depth even though their length is restricted. The joints between the bracket 1 and the lenses 4 are made stronger through the use of such a shaped structural configuration.

As shown in FIG. 4, both the bracket portion 1' and the lenses 4 are coated with a bonding agent 5 after the parts have been degreased. The bonding agent of this invention includes a low melting powder metal material and an epoxy resin having a hydrogen containing hardener such as alkalis, bases, etc. An epoxy resin used in a specific embodiment of this invention is known by the trade name "Araldite." The Araldite is commercially available from its manufacturer by its commercial name "At 1," which is an epoxy resin bound with a latent hardener.

In this connection, the epoxy resin may be a solid resin with an epoxy content between 2.2 and 2.4 mol/kg based on bisphenol-A-epichlorohydrin, which is mixed with 5 percent dicyanodiamide and ground up. This substance has been produced for 24 years without a change. Its technical details are as follows:
Chemical formula:

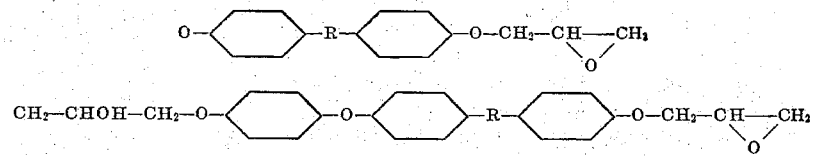

Base: Epoxy resin.
No mixture ratio since this is a single component material.
Color: Light brown to beige.
Viscosity: Powder or paste.
Specific gravity: 1.26.
No dropping time since this a single component material.
Consumption: 140 to 160 gr/m² with a coating thickness from 0.1 to 0.3mm.
Hardening times:

| °C | Minimum | Maximum |
| --- | --- | --- |
| 110 | 48 h | without restriction |
| 120 | 24 h | without restriction |
| 130 | 10 h | without restriction |
| 200 | 30 min. | 60 min. |
| 220 | 10 min. | 60 min. |
| 250 | 7 min. | 10 min. |
| 280 | 3 min. | 5 min. |

The higher the temperature applied to the combination of the metal parts, lenses and bonding agent, the shorter is the hardening time. With temperatures above 200° C, hardening is immediate and may be referred to as shock hardening. A special advantage of high temperature hardening consists in that it enables strength values up to 6 kg/mm² to be attained. The substance "Araldite" is additionally mixed with the powder of a readily melting metal such as tin (melting point 230° C) or bismuth (melting point 270° C).

The method of the invention makes use of a bonding agent that may be prepared as a powder or as a paste. The bonding agent powder may include two to three parts of Araldite AT 1 and 0.5 to 1 part metal powder, i.e., one-half tin and one-half bismuth. To form a paste bonding agent, the composition is the same as in the case of the powder. Sandalwood oil is added to the powder in order to promote adhesion and form the paste.

The bracket 1 and lenses 4 are prepared by (1) degreasing, (2) possibly roughening of the areas to be bonded together, (3) coating of the points to be bonded with the bonding agent prepared in the form of powder or paste. The prepared parts 1 and 4 are fit together and fixed in a correct mutual position as shown in FIG. 5. Subsequently the parts are heated to a temperature in the range of from about 200° C to 300° C. High temperature heating results in shock hardening with strength values up to 6 kg/mm². The readily meltable metal powder, such as tin, bismuth or other metal powder having a low melting point, is very important. The heating of the joint to form the bond causes an additional reinforcing metal structure to be formed by sintering of the metal powder. Additionally, the metal diffuses into the metal of the spectacle parts so as to form an intimate bond with the latter. During this process, diffusion is promoted where the particular metal expands on cooling. This is especially true in the use of bismuth powder. Such expansion upon cooling exerts a pressure in the direction of diffusion. Consequently, the bonding strength per unit of area is very high, and the size of the metal parts of the spectacles can be considerably reduced thus yielding the desired advantages associated with the invention. In other words, the presence of the metal powder provides a further reinforcement to the joint along with the cured structure of the epoxy resin.

Figure 2:
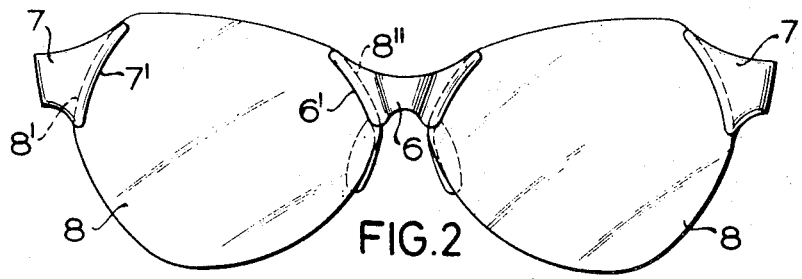
FIG. 2 is a view similar to FIG. 1 showing a pair of spectacles made in accordance with the second embodiment of this invention.

The embodiment of this invention as shown in FIG. 2 is directed to the construction of spectacles without the bracket 1 as was present in the embodiment of FIG. 1. A bridge 6 and two mounting pieces 7 for a bow hinge (not shown) are directly bonded to the spectacle lenses 8. The joints between the edge portions 6′, 7′ of parts 6 and 7, respectively, and 8′, 8″ of the spectacle lenses 8 are designed and bonded in exactly the same way as with the embodiment according to FIG. 1.

In these specific embodiments, the metal spectacle parts and the silicate glass lenses are coated with the bonding agent at the points of attachment before they are placed in a mutually fixed position with respect to each other. That is, the bonding agent of the invention is melted onto those portions of the metal parts and lenses at a time preceding the assembly operation. The bonding agent is heated to adhere the epoxy resin onto the respective spectacle part at a temperature of about 130° C. Spectacle parts prepared in this way can be kept in stock and fixed to one another at a later date. They may be selected as desired and firmly joined with one another by ultrasonic, infrared or resistance welding. Parts prepared in this way can be bonded where they have not been coated previously with the bonding agent such as in the process of making repairs to spectacles.

The bonding agent of this invention can also be introduced to the point of attachment by coating it on both sides of a metal foil or metal wire. That is, the powder or paste may be applied to such a foil or wire which is subsequently introduced into the joint. Once located in the joint, an electric current is passed through the foil or wire so that the joint is heated to a temperature of up to about 300° C to solidify the mixture constituting the bonding agent. This type of joint can also be produced only after fitting together of the parts as in the instance of repairing spectacles.

Figure 6:
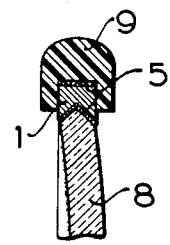
FIG. 6 is a cross-sectional view through a third embodiment of a combination made in accordance with this invention.

If it is desired to add decorative features for esthetic reasons, metal spectacle bracket 1 may be combined with a molding 9 or other decorative feature consisting of plastic as shown in FIG. 6. The plastic parts may also be bonded to the metal parts with the bonding agent of this invention as diagrammatically shown in FIG. 6.

While the optical spectacles and method of making same has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A pair of spectacles comprising:
    a. metal frame parts,
    b. lenses composed of silicate glass, and
    c. a heat cured agent disposed between and in direct contact with said metal parts and lenses,
    d. said bonding agent comprising a mixture of a powder metal material having a low melting point and a heat curable epoxy resin having a hardener which provides a source of hydrogen,
    e. whereby when the combination of frame parts, lenses and bonding agent is subjected to a temperature in a range of about 200° C and about 300° C, a welded bond having great strength is formed.

2. A pair of spectacles as defined in claim 1 wherein said metal frame parts include a bridge and mounting pieces for bow hinges.

3. A pair of spectacles as defined in claim 1 wherein said metal parts have a V-groove and said lenses have a roof profile along the edge to be joined to the frame part in said V-groove, said bonding agent being disposed between said V-groove and roof profile.

4. A pair of spectacles as defined in claim 1 wherein at least one decorative plastic molding is connected to said metal frame parts by means of the bonding agent.

5. A pair of spectacles as defined in claim 1 wherein said low melting metal powder is selected from the group consisting of tin and bismuth.

6. A pair of spectacles as defined in claim 1 wherein the bonding agent forms a contiguous layer on the metal parts and the silicate glass lenses before the frame parts and lenses are bonded together by subjecting the combination to heat.

* * * * *